(12) United States Patent
Maeda et al.

(10) Patent No.: US 7,743,337 B1
(45) Date of Patent: Jun. 22, 2010

(54) ELECTRONIC MAP APPARATUS AND ELECTRONIC MAP DISPLAY METHOD

(75) Inventors: Hiroshi Maeda, Kanagawa (JP); Nobuhiro Ozu, Tokyo (JP); Ippei Tanbata, Kanagawa (JP); Emi Arakawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/553,530

(22) Filed: Apr. 20, 2000

(30) Foreign Application Priority Data

Apr. 21, 1999 (JP) .................................. 11-113381

(51) Int. Cl.
*G08G 1/23* (2006.01)

(52) U.S. Cl. ................ 715/781; 340/995.1; 340/995.27

(58) Field of Classification Search ................ 345/855; 340/988–990, 991, 995, 968, 995.1, 995.27; 701/212, 208; 715/764, 765, 781–782, 855
See application file for complete search history.

(56) References Cited

U.S. PATENT DOCUMENTS

| | | | | |
|---|---|---|---|---|
| 4,783,071 A | * | 11/1988 | Tattershall | 473/407 |
| 5,212,643 A | * | 5/1993 | Yoshida | 701/212 |
| 5,563,608 A | * | 10/1996 | Tachita et al. | 342/357.14 |
| 5,732,385 A | * | 3/1998 | Nakayama et al. | 701/201 |
| 5,908,464 A | * | 6/1999 | Kishigami et al. | 701/208 |
| 5,913,918 A | * | 6/1999 | Nakano et al. | 701/208 |
| 5,938,719 A | * | 8/1999 | Arakawa et al. | 701/207 |
| 5,945,927 A | * | 8/1999 | Nakayama et al. | 340/995.14 |
| 6,011,494 A | * | 1/2000 | Watanabe et al. | 340/995 |
| 6,012,014 A | * | 1/2000 | Koyanagi et al. | 701/208 |
| 6,282,490 B1 | * | 8/2001 | Nimura et al. | 701/208 |
| 6,356,835 B2 | * | 3/2002 | Hayashi et al. | 701/208 |

FOREIGN PATENT DOCUMENTS

| | | |
|---|---|---|
| CN | 1147628 A | 4/1997 |
| DE | 197 13 802 | 5/1998 |
| EP | 0 378 271 | 7/1990 |
| EP | 378271 A1 * | 7/1990 |
| EP | 0 749 103 | 12/1996 |
| JP | 07-027844 | 1/1995 |
| JP | 9-101746 A | 4/1997 |
| JP | 9-133542 A | 5/1997 |
| JP | 09-145390 | 6/1997 |

OTHER PUBLICATIONS

Office Action from the Japanese Patent Office dated Aug. 30, 2006, for application JP-11-113381 (6 pages).

* cited by examiner

*Primary Examiner*—Dennis Bonshock
(74) *Attorney, Agent, or Firm*—Finnegan, Henderson, Farabow, Garrett and Dunner, L.L.P.

(57) ABSTRACT

In an electronic map apparatus, an electronic map is displayed in accordance with map data read out from a DVD-ROM. Then, distance display circles which have a common center located at a point on the electronic map and each interconnect points on the electronic map at equal geographical distances from the point are drawn.

As a result, it is possible to know an approximate geographical distance to a destination intuitively and easily in the electronic map apparatus which is typically used for car navigation.

16 Claims, 4 Drawing Sheets

ELECTRONIC MAP APPARATUS AND ELECTRONIC MAP DISPLAY METHOD

BACKGROUND OF THE INVENTION

The present invention relates to an electronic map apparatus and a method of displaying an electronic map.

In an onboard navigation apparatus mounted on a vehicle, a map is displayed on a display unit in accordance with map data read out from a memory such as a CD-ROM. Typically, there is provided a function to draw lines along longitude and latitude lines, superposing the lines on the map at predetermined intervals to form a shape resembling a checkerboard as shown in FIG. 6A.

Thus, by using this drawing function, for example, it is possible to know an approximate geographical distance between the present position of the vehicle and a destination of the vehicle such as a location or a building.

In addition, electronic map viewer application software executed on a personal computer, for example, includes a function for displaying a scale showing a geographical distance outside the frame of a displayed map. By using this distance scale, a geographical distance can also be determined.

In the case of such a display method, however, in an attempt to know the approximate geographical distance between the present position of the vehicle and the destination of the vehicle such as a location or a building while driving the vehicle, it is difficult to know the geographical distance instantaneously. Particularly, it is more difficult to know a geographical distance in a direction slanting with respect to a longitude or latitude line.

FIG. 6A is a diagram showing a map in a top view. In general, however, an onboard navigation apparatus mounted on a vehicle also includes a function to convert original map data into a map displayed in a perspective view as shown in FIG. 6B.

On a map displayed in a perspective view, a unit-length distance varies from position to position as well as from direction to direction. It is thus much more difficult to intuitively and speedily know an actual geographical distance.

SUMMARY OF THE INVENTION

The present invention addresses such problems.

In order to solve the problems described above, the present invention provides an electronic map apparatus comprising: data fetching means for fetching map data from media for storing the map data to be displayed as a map; a display device for displaying the map in accordance with the map data; and a microcomputer for processing data of a circle or an arc which has a center at a specified point on the map and links points on the map at equal geographical distances from the center, wherein the circle or the arc is displayed on the map displayed on the display device in accordance with the data processed by the microcomputer.

Thus, a circle or an arc representing a geographical distance is drawn on an electronic map.

DETAILED DESCRIPTION OF THE PREFERRED EMBODIMENTS

An onboard navigation apparatus mounted on a vehicle is normally provided with a function to display the position of the vehicle on an electronic map appearing on a display unit.

In addition, with an onboard navigation apparatus mounted on a vehicle or electronic map viewer application software, the user is allowed to scroll an electronic map appearing on a display unit by operating components such as a cursor key and a mouse. In order to clearly indicate a location serving as an object of operation after the scroll processing, normally, the application software displays a cross-shaped cursor or a finger mark as a scroll center mark at a position in close proximity to the center of the map.

The present invention allows the user to know a geographical distance on an electronic map speedily and intuitively by focusing on these points.

In the following description, the present invention is exemplified by an embodiment as applied to an onboard navigation apparatus mounted on a vehicle by referring to FIG. 1.

Figure 1:
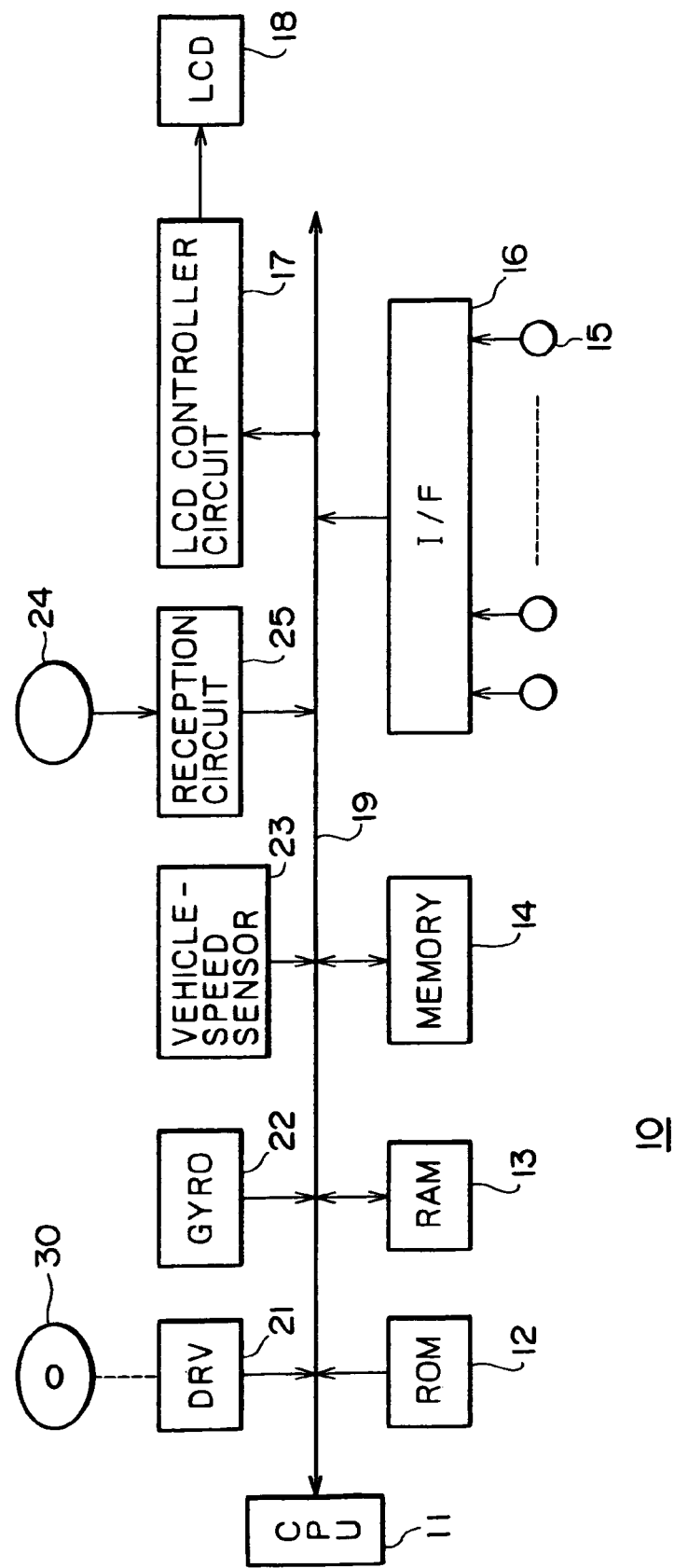
FIG. 1 is a block diagram showing an embodiment of the present invention.

FIG. 1 is a diagram showing a navigation apparatus employing a microcomputer 10 used as a control circuit for controlling the apparatus. As shown in the figure, the microcomputer 10 comprises a CPU 11 for executing a variety of programs, a ROM 12 for storing these programs, a RAM 13 used as a work area and a non-volatile memory 14 for holding various kinds of data. The CPU 11, the ROM 12, the RAM 13 and the non-volatile memory 14 are connected to each other by a system bus 19.

In addition, the system bus 19 is also connected to a variety of operation keys 15 through a key interface circuit 16 and connected to a color LCD 18 serving as a display device through an LCD controller circuit 17.

The navigation apparatus shown in FIG. 1 employs a DVD-ROM 30 as media with a large capacity for storing various kinds of map data required for navigation. The map data includes data used as a base for displaying a map and data of roads for map matching. The navigation apparatus thus includes a DVD-ROM drive 21 for reading out data from the DVD-ROM 30. The DVD-ROM drive 21 is also connected to the system bus 19.

The navigation apparatus also includes a gyro 22 serving as a self-contained navigation unit. The gyro 22 generates data such as its own movement speed, supplying the data to the microcomputer 10. In addition, the navigation apparatus has a vehicle-speed sensor 23 for detecting the running speed of the vehicle. A detection signal generated by the vehicle-speed sensor 23 is also supplied to the microcomputer 10.

Furthermore, a wave transmitted by a navigation satellite such as a GPS satellite is received by a GPS antenna 24 and a signal generated by the GPS antenna 24 to represent the received wave is supplied to a GPS unit (reception circuit) 25. The GPS unit 25 generates data such as the position of the vehicle, supplying the data to the microcomputer 10.

Figure 2A:
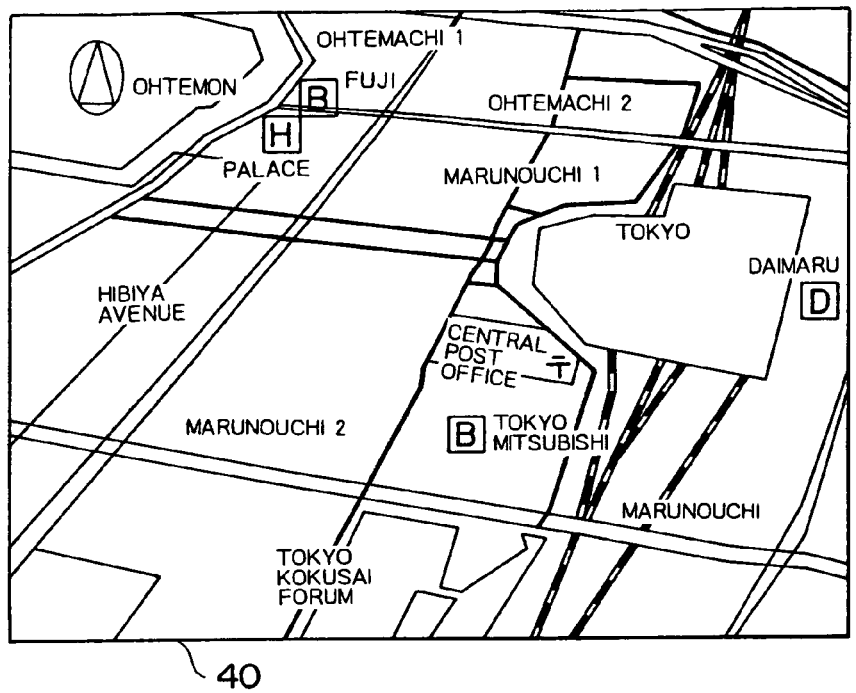
FIGS. 2A and 2B are perspective views each showing a display example provided by the present invention.

In such a configuration, the signals output by the gyro 22, the vehicle-speed sensor 23 and the GPS unit 25 are processed by the CPU 11 to determine the position of the vehicle. Then, data of a map including the position of the vehicle is read out from the DVD-ROM 30. Subsequently, an electronic map 40 centered at the vicinity of the vehicle position is displayed on the LCD 18 typically as shown in FIG. 2A. In addition, a mark 41 typically resembling an inverted V-character for representing the vehicle is displayed at the position of the vehicle. It should be noted that FIG. 2A is a diagram showing the electronic map 40 in a perspective view.

Figure 2B:
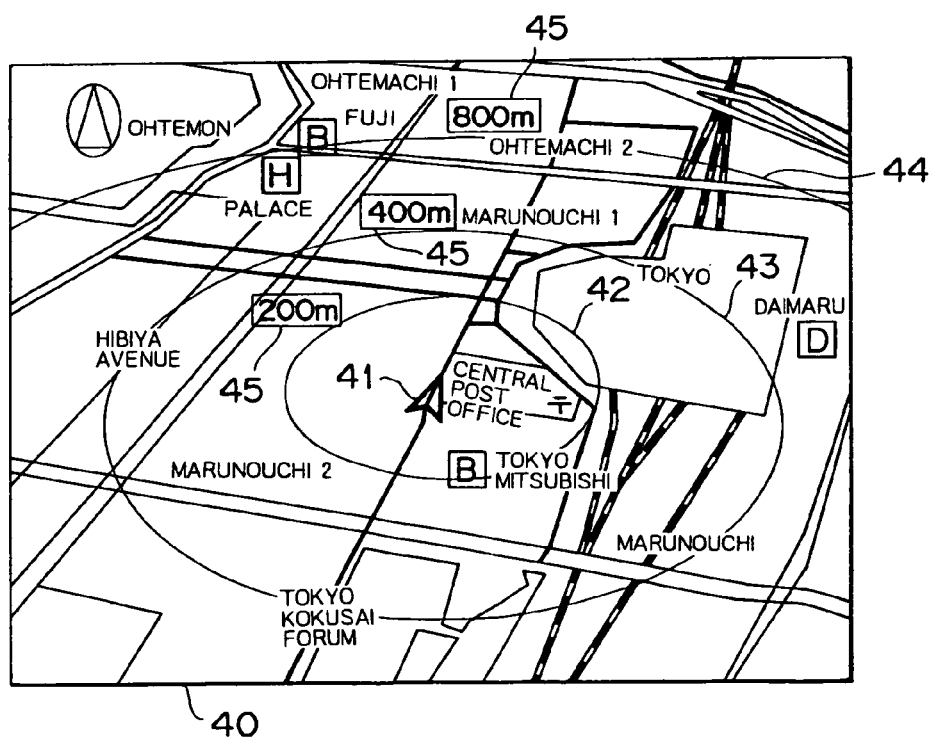

Then, when a predetermined key among the keys 15 is operated, concentric distance display circles 42, 43 and 44 centered at the vehicle mark 41 or with a center located at the position of the vehicle are displayed on the electronic map 40 as shown in FIG. 2B. The concentric distance display circles 42 to 44 which are centered at the vehicle mark 41 are each an equidistant curve interconnecting points on the electronic map 40 at equal geographical distances to the vehicle mark 41. In the case of the example shown in FIG. 2B, since the electronic map 40 is displayed in a perspective view, the distance display circles 42 to 44 each appear approximately as an ellipse.

The distance display circles 42 to 44 shown in FIG. 2B are equidistant curves interconnecting points at distances of 200 m, 400 m and 800 m respectively which form a geometrical series. The distance display circles 42 to 44 are each marked with a number 45 indicating the geographical distance from the vehicle mark 41 at a location in close proximity to the curve.

It should be noted that the geographical distances for the distance display circles 42 to 44 and the marking numbers 45 are set at values such as 50 m, 100 m, 200 m and 400 m which correspond to the degree of contraction of the displayed electronic map 40. The distance display circles 42 to 44 are displayed by execution of a program to draw the circles 42 to 44 by the CPU 11. The program is stored in the ROM 12 in advance. In the case of the distance display circle 44, only an arc thereof or a partial equidistant curve of the circle 44 is displayed on the electronic map 40 shown in FIG. 2B.

As described above, the navigation apparatus displays the electronic map 40 on the LCD 18 and the distance display circles 42 to 44 which have a center at the vehicle mark 41 and connect points at equal geographical distances from the center. Thus, an approximate geographical distance to a destination such as a location or a building can be intuitively and speedily known.

In addition, in this case, the geographical distance can be known without a problem even if the electronic map 40 is displayed in a perspective view and, moreover, even if the destination is located in a slanting direction.

Furthermore, since an approximate geographical distance from the position of the vehicle to a destination can be known intuitively and speedily from the electronic map 40, the map 40 can be used as a reference of a drive plan with ease. Additionally, since the electronic map 40 is displayed in a perspective view, the distance display circles 42 to 44 provide an improved three-dimensional effect. Moreover, by merely adding a program for displaying the distance display circles 42 to 44 to a drawing driver (or a drawing software program), the effect described above can be obtained.

Figure 3:
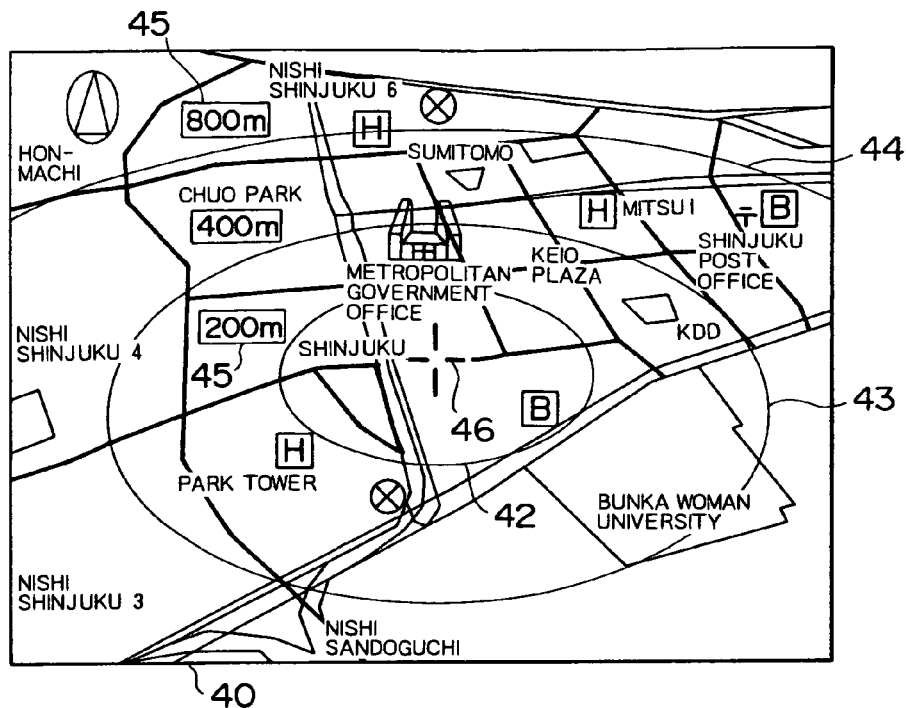
FIG. 3 is a perspective view showing a display example provided by the present invention.

FIG. 3 is a diagram showing a cross-shaped cursor 46 indicating a scroll center at a location in close proximity to the center of the electronic map 40 which is displayed in a perspective view. The figure also shows the distance display circles 42, 43 and 44 which have a common center at the cross-shaped cursor 46 and connect points at equal geographical distances of 200 m, 400 m and 800 m respectively from the center.

Figure 4:
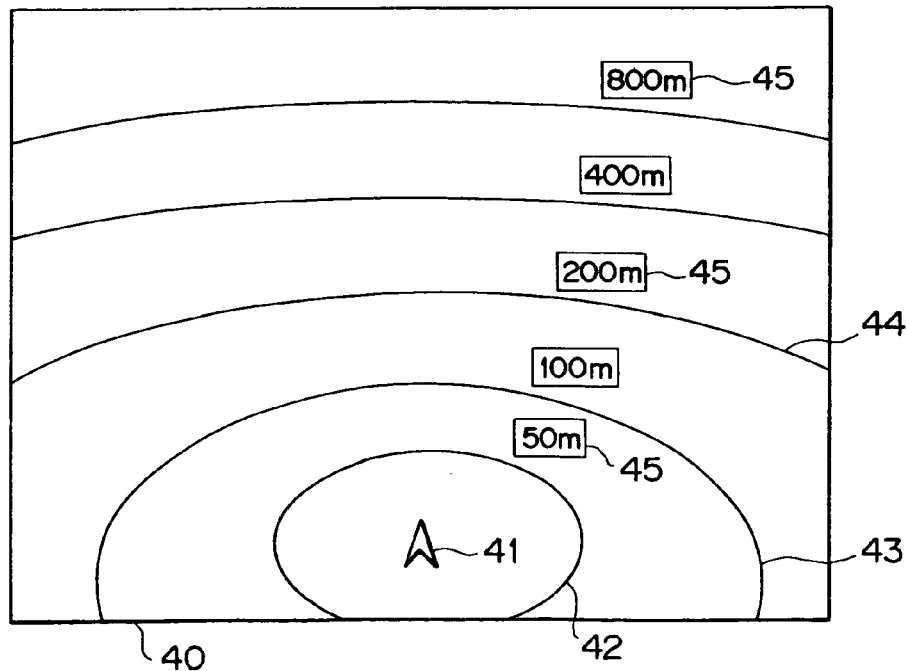
FIG. 4 is a perspective view showing a display example provided by the present invention.

FIG. 4 is a diagram which shows the electronic map 40 in a perspective view after shifting the electronic map 40 in the direction of the vehicle movement so that the vehicle mark 41 is located below the center of the electronic map 40 in order to display more information on locations on the electronic map 40 in the direction of the vehicle movement. In such a case, the whole circumferences or partial arcs of the distance display circles 42 to 44 and distance display circles on the outer side of the circles 42 to 44 can each be displayed as an equidistant curve.

Figure 5:
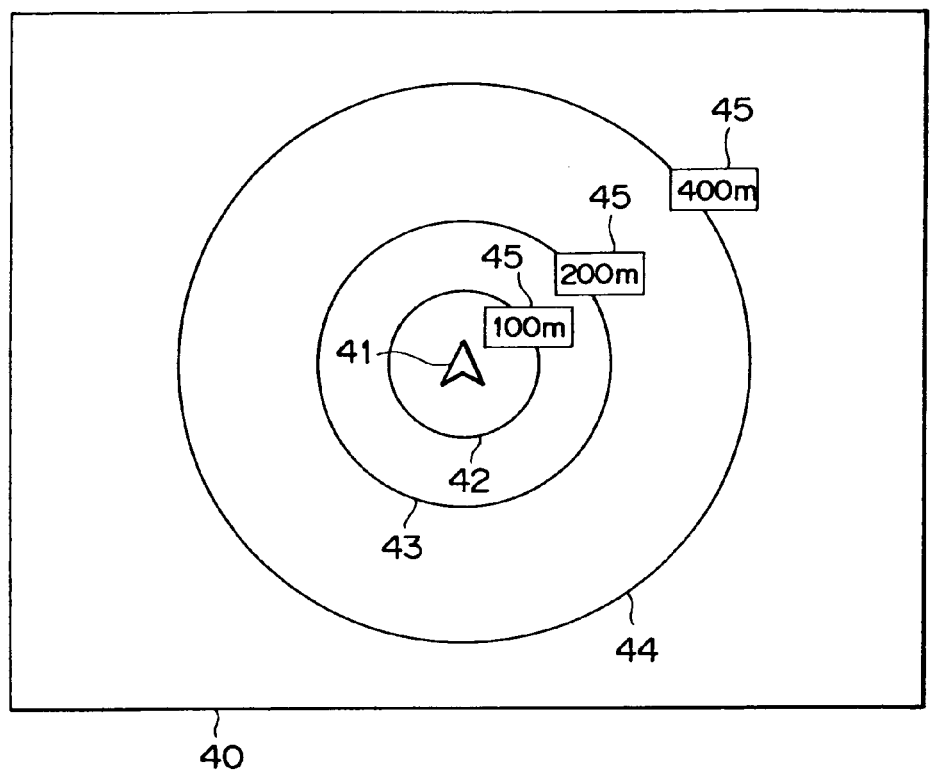
FIG. 5 is a top view showing a display example provided by the present invention.
Figure 6A:
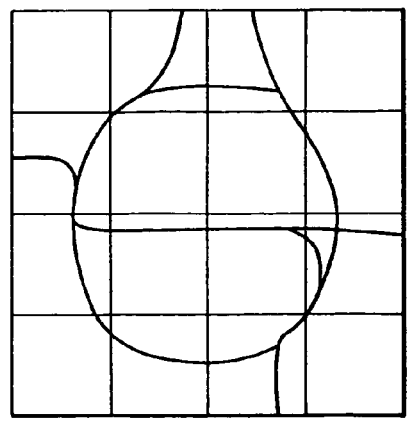
FIGS. 6A and 6B are explanatory diagrams used for describing the present invention.
Figure 6B:
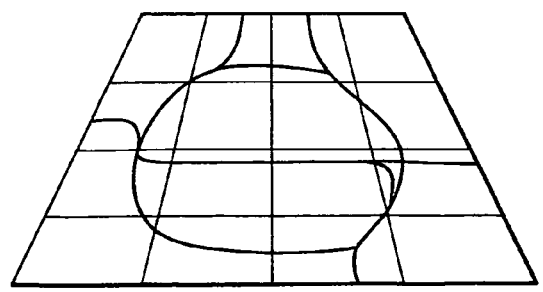

FIG. 5 is a diagram showing the electronic map 40 in a top view. In this form, the distance display circles 42 to 44 are each displayed almost as a true circle.

Also in the case of these electronic maps 40, a geographical distance can be known intuitively and speedily from the distance display circles 42 to 44.

It should be noted that, by displaying the distance display circles 42 to 44 each as a shadowed figure or as a highlighted figure, or by providing a ground color such as a supplementary color of a drawn portion to the distance display circles 42 to 44, the circles 42 to 44 can be made more clearly visible.

In addition, by displaying a character or a symbol to represent a direction on the circumference of a circle with the center thereof located at the vehicle mark 41 on the electronic map 40 appearing in a perspective view, it is possible to easily and instantly know the running direction, of the vehicle, which is difficult to recognize in a perspective view.

Furthermore, it is also possible to display lines radiately from the position of the vehicle or the center of the electronic map 40 and display a scale representing the geographical distance from the position of the vehicle or the center of the electronic map 40 on each of the lines.

Moreover, in place of the distance display circles 42 to 44, the electronic map 40 can also be displayed as areas having different colors with the circles 42 to 44 each serving as a border between two adjacent colors. Assuming that the display processing hardware comprises two or more layers, the electronic map 40 is drawn at the lower layer whereas the upper layer is made a semi-transparent layer, and colors are provided with the circles 42 to 44 each serving as a border between two adjacent colors.

Additionally, while the present invention is exemplified by an onboard navigation apparatus mounted on a vehicle in the above description, the invention can also be applied to a case in which a map is displayed in accordance with map data on a PDA or a personal computer. Furthermore, media with a large storage capacity such as a CD-ROM can also be employed in place of the DVD-ROM 30. Moreover, the format of map data used as a base for displaying the electronic map 40 on the display apparatus does not matter.

What is claimed is:

1. An electronic map apparatus comprising:
   media storing map data to be displayed as a map;
   a display device for displaying the map including areas having different colors representing different geographical areas in a perspective view in accordance with the map data; and
   a microcomputer for processing display data of an arc which is an equidistant curve from a center at a specified point on the map and links points on the perspective view at a constant distance corresponding to actual road distances from the center equal to those on the map,
   wherein the microcomputer:
   selectively displays the perspective view on the display device, wherein in the perspective view, the arc of the equidistant curve is displayed as a border between two adjacent colors on the basis of the arc's display data being superimposed on the map, the arc being made more visible by highlighting the arc or by shadowing the arc;

processes data of a plurality of arcs representing different geographical distances from the center, wherein the arcs are each superposed on the map displayed in the perspective view as ellipses in response to receipt of a predetermined input requesting display of the arcs;

outputs, in the perspective view, numbers each indicating a geographical distance from the center to one of the plurality of arcs and displays each of the numbers at a location in close proximity to the circumference of the plurality of arcs with a geographical distance thereof indicated by the number;

displays a cursor indicating a scroll center in close proximity to a common center of the map, the scroll center providing a reference point for an object of operation during scrolling of the map in a vehicle;

changes contraction of the map displayed on the display device in the perspective view; and outputs a first character or a first symbol representing a first direction of the map in close proximity to or on one of the arcs.

2. The electronic map apparatus according to claim 1, wherein:

the electronic map apparatus is a navigation apparatus mounted on a vehicle;

the specified point is the position of the vehicle;

map data of a map including the position of the vehicle is read out from the media; and the map is displayed in the perspective view in accordance with the map data read out from the media.

3. The electronic map apparatus according to claim 1, wherein the specified point is a point on a map specified by a user.

4. The electronic map apparatus according to claim 2, wherein a second character or a second symbol representing a second direction is displayed at the specified point.

5. The electronic map apparatus according to claim 1, wherein a plurality of the arcs are displayed so that the constant distance for each equidistant curve corresponding to actual road distance is changed in accordance with the perspective of the map being displayed in the perspective view.

6. The electronic map apparatus according to claim 1, wherein the microcomputer selectively displays a plane view on the display device, wherein in the plane view, a corresponding distance from the center of the arc of equidistant curve is displayed on one of a plurality of the arcs of equidistant curves.

7. The electronic map apparatus according to claim 1, wherein the microcomputer modifies the geographical distances from the center to the arcs and modifies the number of the arcs in accordance with a degree of contraction of the map.

8. The electronic map apparatus according to claim 1, wherein the microcomputer changes a color of the arc into a supplementary color of a drawn portion to the distance display arc.

9. An electronic map display method comprising the steps of:

fetching map data from media storing the map data to be displayed as a map;

displaying the map as areas having different colors representing different geographical distances on a display device in a perspective view in accordance with the map data;

displaying an arc, which is an equidistant curve from a center at a specified point on the map and links points on the perspective view at a constant distance corresponding to actual road distances from the center equal to those on the map, and selectively displaying the perspective view on the display device, wherein in the perspective view, the arc of equidistant curve is displayed as a border between two adjacent colors on the basis of the arc's display data being superimposed on the map, the arc being made more visible by highlighting the arc or by shadowing the arc;

displaying, in the perspective view, a plurality of arcs representing different geographical distances from the center, the arcs being displayed as ellipses in response to receipt of a predetermined input requesting display of the arcs;

displaying, in the perspective view, numbers each indicating a geographical distance from the center to one of the arcs at a location in close proximity to the circumference of the arc;

displaying a cursor indicating a scroll center in close proximity to a common center of the map, the scroll center providing a reference point for an object of operation during scrolling of the map in a vehicle;

changing the geographical distances from the center to the arcs and changing the number of the arcs in accordance with a degree of contraction of the map; and outputting a first character or a first symbol representing a first direction of the map in close proximity to or on one of the arcs.

10. The electronic map display method according to claim 9, wherein:

the position of a vehicle on which a navigation apparatus is mounted is specified as the specified point;

map data of a map including the position of the vehicle is read out from the media; and the map is displayed in the perspective view in accordance with the map data read out from the media.

11. The electronic map display method according to claim 9, wherein a point on the map is specified by a user as the specified point.

12. The electronic map display method according to claim 9, wherein a second character or a second symbol representing a second direction is displayed at the specified point.

13. The electronic map display method according to claim 9, wherein a plurality of the arcs are displayed so that the constant distance for each equidistant curve corresponding to actual road distance is changed in accordance with the perspective of the map being displayed in the perspective view.

14. The electronic map display method according to claim 9, further comprising:

displaying a plane view on the display device, wherein in the plane view, a corresponding distance from the center of the arc of equidistant curve is displayed on one of a plurality of the arcs of equidistant curves.

15. The electronic map display method according to claim 9, further comprising:

displaying a plurality of arcs representing different geographical distances from the center and displaying the arcs on the map displayed in the perspective view.

16. The electronic map display method according to claim 9, further comprising:

changing a color of the arc into a supplementary color of a drawn portion to the distance display arc.

* * * * *